United States Patent
Chatterji et al.

(10) Patent No.: US 10,570,328 B2
(45) Date of Patent: Feb. 25, 2020

(54) DELAYING POLYMER HYDRATION IN WELL TREATMENT FLUIDS BY USING SILICA INFUSION

(71) Applicant: Halliburton Energy Services, Inc., Houston, TX (US)

(72) Inventors: Jiten Chatterji, Duncan, OK (US); Darrell Chad Brenneis, Marlow, OK (US); James Robert Benkley, Duncan, OK (US); Gregory Robert Hundt, Houston, TX (US); Lennox Martin Leotaud, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/072,126

(22) PCT Filed: Apr. 18, 2016

(86) PCT No.: PCT/US2016/028140
§ 371 (c)(1),
(2) Date: Jul. 23, 2018

(87) PCT Pub. No.: WO2017/184111
PCT Pub. Date: Oct. 26, 2017

(65) Prior Publication Data
US 2019/0031941 A1   Jan. 31, 2019

(51) Int. Cl.
*E21B 43/25*    (2006.01)
*C09K 8/467*    (2006.01)
(Continued)

(52) U.S. Cl.
CPC .............. *C09K 8/467* (2013.01); *C04B 28/02* (2013.01); *E21B 21/062* (2013.01); *E21B 33/13* (2013.01); *E21B 33/14* (2013.01); *E21B 43/25* (2013.01)

(58) Field of Classification Search
CPC ....... C09K 8/467; C04B 28/02; E21B 21/062; E21B 33/14; E21B 43/25
See application file for complete search history.

(56) References Cited

U.S. PATENT DOCUMENTS 8,530,541 B2 * 9/2013 James .................. C04B 18/022
166/293
8,623,936 B2 * 1/2014 Roddy .................. C04B 24/26
106/638

(Continued)

FOREIGN PATENT DOCUMENTS

WO     97013578     4/1997
WO     2012087388   6/2012

OTHER PUBLICATIONS

International Search Report and Written Opinion for PCT/US2016/028140 dated Jan. 6, 2017.

*Primary Examiner* — Silvana C Runyan
(74) *Attorney, Agent, or Firm* — Thomas Rooney; C. Tumey Law Group PLLC (57) ABSTRACT

A variety of systems, methods and compositions are disclosed. A method of well treatment may comprise providing a well treatment fluid comprising a base fluid and a delayed hydratable polymer, wherein the delayed hydratable polymer comprises a hydratable polymer and amorphous silica. The method may further comprise introducing the well treatment fluid into a wellbore.

20 Claims, 2 Drawing Sheets

(51) Int. Cl.
*C04B 28/02* (2006.01)
*E21B 21/06* (2006.01)
*E21B 33/13* (2006.01)
*E21B 33/14* (2006.01)

(56) References Cited

U.S. PATENT DOCUMENTS

| | | | |
|---|---|---|---|
| 2004/0262000 A1* | 12/2004 | Morgan | C04B 28/02 |
| | | | 166/293 |
| 2010/0193191 A1* | 8/2010 | Roddy | C09K 8/03 |
| | | | 166/292 |
| 2011/0112211 A1* | 5/2011 | Audibert | C04B 20/1055 |
| | | | 523/130 |
| 2015/0075792 A1 | 3/2015 | Brandl et al. | |
| 2015/0198010 A1 | 7/2015 | Doan et al. | |
| 2015/0204165 A1 | 7/2015 | Yeung et al. | |
| 2016/0017688 A1 | 1/2016 | Chatterji et al. | |

\* cited by examiner

DELAYING POLYMER HYDRATION IN WELL TREATMENT FLUIDS BY USING SILICA INFUSION

BACKGROUND

Hydratable polymers have extensive use in oilfield applications. Some common terms for these hydratable polymers may include water soluble, collodially dispersible (hydrocolloids), and water swellable. Hydratable polymers may commonly be used as thickeners or viscosifiers in well treatment fluids. Natural hydratable polymers such as guar gum, dituan gum, xanthan gum, or synthetic polymers such as hydroxy cellulose and carboxymethyl hydroxyethyl cellulose are common rheology modifiers that may be added to a variety of well treatment fluids. In fracturing fluids, the hydratable polymers may thicken and gel to hold the proppant in solution. Without the added viscosity, the proppant may settle out of solution and cause pumping problems and poor treatment results. In cementing applications, hydratable polymers may act as water-retention agents, suspending agents, lubricants, and/or friction modifiers, among others.

Despite the advantages of using hydratable polymers in well treatment fluids, such treatments may be problematic. When the hydratable polymers are added to the mixing tub in fracturing operations, they may exhibit excessive viscosity and cause the fracturing fluid to need extra hydraulic horsepower to clear the tub and be pumped down hole. The sudden increase in viscosity resulting from rapid hydration may lead to mixing and pumping problems. When these materials are added to the water at too fast of a rate, polymer clumps may be seen. These clumps may solvate to form a tough outer layer that prevents complete hydration of the interior particles. This may result in solutions with grainy texture, reduced viscosity, or the presence of insoluble particles. The high shear conditions needed to break up these agglomerations may also over shear the already hydrated particles resulting in permanent loss of viscosity.

BRIEF DESCRIPTION OF THE DRAWINGS

These drawings illustrate certain aspects of some of the systems, methods and compositions of the present disclosure, and should not be used to limit or define the systems, methods and/or cement compositions.

DETAILED DESCRIPTION

The present disclosure relates to delaying the hydration of hydratable polymers when added to water and, in specific examples, to methods, compositions, and systems that use delayed hydratable polymers for treatment of subterranean formations. By way of example, the delayed hydratable polymers may be used in any well treatment fluid that requires rheology modification. Some well treatment fluids where the delayed hydratable polymers may be used may include cement compositions, fracturing fluids, completion fluids, drilling fluids, spacer fluids, and others as described in the art. Of particular interest may be inclusion of the delayed hydratable polymers in a cementing composition.

There may be several potential advantages to the methods and compositions of the present disclosure, only some of which may be alluded to herein. One of the many potential advantages of the methods and compositions of the present disclosure is that, due to the delay of hydration, less horsepower may be needed to pump the treatment fluids. Another potential advantage of the methods and compositions of the present disclosure may include longer working times due the delayed hydration.

The use of conventional hydratable polymers in well treatment fluids presents many practical and engineering problems. In many cases it may be desirable to modify the viscosity of a fluid with a hydratable polymer. When a hydratable polymer is added to an aqueous system, the hydratable polymer may hydrate quickly and rapidly increase the viscosity of the aqueous system to which it is added. The sudden increase in viscosity may make the fluid difficult to mix and evenly dispersing additional chemicals in the fluid may be problematic. Additionally, the high shear rate needed to pump the viscous fluid may over shear the fluid to where it permanently loses viscosity. The high shear rate needed corresponds to high horsepower and may make pumping the viscous fluid more expensive. The hydratable polymers may also "fish eye" or create insoluble lumps of partially hydrated polymer in the fluid. The outer layers of a nodule of polymer hydrate generating a tough outer shell of hydrated polymer and inner ball of un-hydrated polymer. High shear may be needed to break up the tough outer layer which may lead to over shear and permanent loss of viscosity. If the fish eyes are not broken up, the fluid may remain grainy and not have the desired viscosity or other fluid properties.

The present disclosure provides for a delayed hydratable polymer comprising a hydratable polymer and amorphous silica. Without limitation, the amorphous silica may infused into, or otherwise combined with, the hydratable polymer to form the delayed hydratable polymer. Without being limited by theory, it is believed that particles of the amorphous silica may infuse into the hydratable polymer and at least partially encapsulate the hydratable polymer to delay the release of the hydratable polymer in an aqueous system. Without limitation, the delayed hydratable polymer may provide clump free hydration and even dispersability in aqueous systems. These delayed hydratable polymers may provide fine control over the rate of hydration by adjusting the content of the amorphous silica. A delayed hydratable polymer should be slower to hydrate than their non-delayed counterpart, and should provide for more complete hydration with less shear required to fully hydrate. The final viscosity of an aqueous system comprising delayed hydratable polymer may generally have the same final viscosity as an aqueous system comprising non-delayed hydratable polymer.

The hydratable polymer to be infused with the amorphous silica may include any suitable hydratable polymer that would be desirable for use in a particular application. Examples of suitable hydratable polymers may include, but are not limited to, natural and synthetic polymers and their derivatives including starch derivatives, cellulose derivatives, alginate, agar, arrowroot, carrageenan, collagen, gelatin, pectin, welan gum, guar gum, diutan gum, 2-Acrylamido-2-methylpropane sulfonic acid and N,N,DMA copolymer, xanthan gum, hydroxy ethyl cellulose, carboxymethyl hydroxyethyl cellulose, polyacrylamide (PAM), partially hydrolyzed polyacrylamide (PHPA), acrylate copolymers, modified acrylamide polymers, graft polymers, and combinations thereof.

A process for preparing the delayed hydratable polymer may comprise infusing a wetted hydratable polymer with silica. Without limitation, a method of preparing the delayed hydratable polymer may first comprise contacting a hydratable polymer with a solvent (e.g., water) to create at least agglomerates of the hydratable polymer, referred to as hydratable polymer agglomerates. Next, the hydratable polymer agglomerates may be dried (e.g., by exposure to elevated temperature) to create dried hydratable polymer agglomerates. The dried hydratable polymer agglomerates may then be contacted with amorphous silica in the presence of a solvent (e.g., water) to create at least a hydratable polymer infused with amorphous silica. Thereafter, the hydratable polymer infused with amorphous silica may be dried (e.g., by exposure to elevated temperature) to remove the solvent and create the delayed hydratable polymer.

Contacting the hydratable polymer with a solvent may comprise combining the hydratable polymer with the solvent. By way of example, water may be used as the solvent to at least partially hydrate the hydratable polymer. Combination with the solvent may produce hydratable polymer agglomerates. The solvent may be added in any suitable amount including, without limitation, in the amounts of from about 1% to about 15% by weight of the hydratable polymer, by about 1% to about 10% by weight of hydratable polymer, by about 5% to about 10% by weight of hydratable polymer, or by about 10% to about 15% by weight of hydratable polymer. It should be understood that these disclosed ranges are merely exemplary and that more or less solvent may be desired for a particular application. The quantity of solvent may be delivered to the hydratable polymer by any means including adding piece-wise or all at once. The solvent may be delivered by any means and without limitation may comprise spraying, misting, atomizing, dumping, pouring, pumping, or other means known in the art. The hydratable polymer may be included in any suitable form, including as a fine powder. In alternative methods, the form of the hydratable polymer may without limitation be chips, flakes, powders, pellets, rods, shavings, strips, wedges, or any other form known in the art. The water may be added to the hydratable polymer under rotation or other agitation. Without limitation, the water may be combined with the hydratable polymer in a tumbler granulator. The granulator may be any type e.g. vertical, horizontal, tumbler, vibrator, etc. The granulator may rotate at about 10 rpm to about 40 rpm and, alternatively, from about 20 rpm to 30 rpm. The granulator may be rotated for about 1 hour, about 2 hours, about 3 hours, about 4 hours, about 5 hours, about 6 hours, or longer, but may be rotated for about 4 hours to about 5 hours in some applications.

Drying the hydratable polymer agglomerates may include exposure to elevated temperatures. Without limitation, the hydratable polymer agglomerates may be exposed to temperatures of about 100° F., about 150° F., about 200° F., about 250° F., or more. Without limitation, the hydratable polymer agglomerates may be exposed to a temperature ranging from about 200° F. to about 250° F. The dried hydratable polymer agglomerates may be sieved after drying. The sieve may without limitation be 100 microns, 500 microns, 1000 microns, 2000 microns, or larger. The dried hydratable polymer agglomerates may be sieved, for example, to provide a desired particle size, for example, of about 3000 microns or less, and, alternatively, about 100 microns to about 1000 microns.

The dried hydratable polymer agglomerates may be contacted with amorphous silica in the presence of a solvent, such as water. The amorphous silica may be used in an amount ranging from about 1% to about 20% by weight of the hydratable polymer agglomerates, including in an amount of about 1%, about 5%, about 10%, about 15%, or about 15% by weight of the hydratable polymer agglomerates. The contact between the dried hydratable polymer agglomerates and the amorphous silica may occur in the presence of a solvent (e.g., water). The solvent may be used in any suitable amount, including amount from about 1% to about 50% by weight of the dried hydratable polymer agglomerates and the amorphous silica, about 10% to about 50% by weight, or about 20% to about 30% by weight. The quantity of solvent may be delivered by any means including adding piece-wise or all at once. The solvent may be delivered by any means and without limitation may comprise spraying, misting, atomizing, dumping, pouring, pumping, or other means known in the art. The amorphous silica and dried hydratable polymer agglomerates may be combined using any suitable technique, including by rotation or other agitation. Without limitation, the combination technique may be rotation in a tumbler granulator. Without limitation, the granulator may be rotated at about 10 rpm to 40 rpm (or 20 rpm to 30 rpm) for about 2 hours to about 3 hours. It is believed that the amorphous silica may enter into the cracks and voids in the dried hydratable polymer agglomerates. It is believed that the amorphous silica may coat the dried hydratable polymer agglomerates as well as entering into the agglomerated structure.

The delayed hydratable polymer may be utilized in any useful variety of subterranean treatments, including, but not limited to, drilling operations, fracturing treatments, cementing operations, wellbore cleanups and sand control treatment. An example method of treating a subterranean formation may include providing a well treatment fluid that comprises a base fluid (e.g., an aqueous fluid) and a delayed hydratable polymer and introducing the well treatment fluid into a wellbore that penetrates the subterranean formation. Without limitation, the treatment fluid may be a cement composition, spacer fluid, drilling fluid, fracturing fluid, spotting fluid, lost circulation treatment fluid, completion brine, or other treatment fluid that may be used in well treatment. By way of example, the delayed hydratable polymer may be included in a fracturing fluid introduced into a subterranean formation above a fracture pressure to create or enhance one or more fractures in the subterranean formation. The delayed hydratable polymer may be included in the fracturing fluid for any suitable function, including, without limitation, as a gelling agent to increase fluid viscosity.

While the present disclosure of delayed hydratable polymers may find application in many well treatment fluids, it may be of particular interest in well cementing. Without limitation, a cement composition may comprise cement, a delayed hydratable polymer, and water. Those of ordinary skill in the art will appreciate that the cement compositions generally should have a density suitable for a particular application. By way of example, the cement composition may have a density in the range of from about 4 pounds per gallon ("lb/gal") to about 20 lb/gal. In certain embodiments, the cement compositions may have a density in the range of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

The cement compositions may comprise a cement. Any of a variety of cements suitable for use in subterranean cementing operations may be used in accordance with systems, methods and cement compositions of the present disclosure. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain systems, methods and cement compositions, the hydraulic cement may comprise a Portland cement. Portland cements that may be suited for use in systems, methods and cement compositions of the present disclosure may be classified as Class A, C, H and G cements according to American Petroleum Institute, API Specification for Materials and Testing for Well Cements, API Specification 10, Fifth Ed., Jul. 1, 1990. In addition, in some systems, methods and cement compositions, hydraulic cements suitable for use in the present disclosure may be classified as ASTM Type I, II, or III.

The delayed hydratable polymer may be included in the cement composition for any suitable purpose. The particular function the delayed hydratable polymer may perform in the cement composition may depend on a number of factors, including, without limitation, the particular hydratable polymer selected and its molecular weight, among others. Without limitation, the delayed hydratable polymer may be included in the cement composition extend the open time or the workability of the cement composition allowing the cement composition to be pumped for longer durations or stored onsite for later use. Cement compositions may be workable if they are easily transported, placed, compacted and cured without undesirable segregation of constituents. The delayed hydratable polymer may also delay a hydration reaction within the cement composition, as well as, increase the degree of hydration of the cement compositions. Moreover, addition of a suitable delayed hydratable polymer may result in faster pumping with lower pressure and reduced blockage. Often copolymers of 2-Acrylomido-2-methylpropane sulfonic acid and N,N,DMA or other synthetic fluid loss additives may be used and mixed into the mixing water or mixing tub prior to the cement being added. The long chain polymers of the delayed hydratable polymer may elongate when hydrated in solution and aid in decreasing turbulence in the fluid and therefore decreasing pipe friction. The lower friction to overcome may mean less horsepower is needed to pump the cement composition downhole. The delayed hydratable polymer may also function to improve water retention and reduce capillary absorption of water from the wellbore. The reduced water uptake may result in a more stable cement composition. The delayed hydratable polymer may have a positive effect on water absorption by increasing absorption resistance because partially agglomerated silica infused hydratable polymer may modify pore structures of the cement compositions.

The delayed hydratable polymer additive may be included in the cement compositions in an amount sufficient for a particular application. Without limitation, the delayed hydratable polymer may be included in a cement composition in an amount in a range of from about 0.1% to about 10% by weight of cement ("bwoc") and, alternatively, from about 0.5% to about 2% bwoc. For example, the delayed hydratable polymer may be included in a cement composition in an amount of about 0.1%, about 0.5%, about 1%, about 2%, about 4%, about 6%, about 8%, or about 10% bwoc. One of ordinary skill in the art, with the benefit of this disclosure, should be able to select an appropriate amount of the delayed hydratable polymer to use for a particular application.

The water used in the cement compositions may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. In certain cement compositions, the water may be present in the cement composition in an amount in the range of about 33% to about 200% bwoc. For example, the water may be present in the cement composition in the range of about 35% to about 70% bwoc. One of ordinary skill in the art with the benefit of this disclosure will recognize the appropriate amount of water for a chosen application.

Other optional additives suitable for use in subterranean cementing operations may also be added to the cement compositions as deemed appropriate by one of ordinary skill in the art. Examples of such additives include, but are not limited to, strength-retrogression additives, set retarders, weighting agents, lightweight additives, gas-generating additives, mechanical property enhancing additives, lost-circulation materials, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, will be able to determine the type and amount of additive useful for a particular application and desired result.

Optionally, strength-retrogression additives may be included in cement compositions to, for example, prevent the retrogression of strength after the cement composition has been allowed to develop compressive strength. These additives may allow the cement compositions to form as intended, preventing cracks and premature failure of the cement composition. Examples of suitable strength-retrogression additives may include, but are not limited to, amorphous silica, coarse grain crystalline silica, fine grain crystalline silica, or a combination thereof.

Optionally, set retarders may be included in cement compositions, to, for example, delay setting for a desired period of time. A broad variety of set retarders may be suitable for use in the cement compositions, including, without limitation, phosphonic acid, phosphonic acid derivatives, lignosulfonates, salts, organic acids, carboxymethylated hydroxyethylated celluloses, synthetic co- or terpolymers comprising sulfonate and carboxylic acid groups, borate compounds, derivatives thereof, or mixtures thereof.

Optionally, weighting agents may be included in the cement compositions. Weighting agents are typically materials that weigh more than water and may be used to increase the density of the cement compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Optionally, lightweight additives may be included in the cement compositions to, for example, decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Optionally, mechanical-property-enhancing additives may be included in the cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Optionally, lost-circulation materials may be included in embodiments of the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Optionally, defoaming additives may be included in the cement compositions to, for example, reduce tendency for the cement slurries to foam during mixing and pumping of the cement slurries. Examples of suitable defoaming additives include, but are not limited to, polyol silicone compounds. Suitable defoaming additives are available from Halliburton Energy Services, Inc., under the product name D-AIR™ defoamers.

Optionally, foaming additives (e.g., foaming surfactants) may be included to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Optionally, thixotropic additives may be included in the cement compositions to, for example, provide an cement composition that may be pumpable as a thin or low viscosity fluid, and when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The cement compositions may set to have a desirable compressive strength. Compressive strength is generally the capacity of a material or structure to withstand axially directed pushing forces. The compressive strength may be measured at a specified time after preparation of the cement composition while the cement composition is maintained under specified temperature and pressure conditions. Compressive strength may be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi to about 5000 psi, alternatively, from about 100 psi to about 4500 psi, or alternatively from about 500 psi to about 4000 psi. Without limitation, the cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures above 400° F. may be of particular importance for potential use in subterranean formations having relatively high bottom hole static temperatures.

In accordance with the systems, methods and cement compositions of the present disclosure, a cement composition may be introduced into a selected location and allowed to set therein. As will be appreciated, the selected location may any suitable location above ground or in a subterranean formation where it is desired for the cement composition to set into a hardened mass. For example, the selected location may be an annulus between a pipe string located in a subterranean formation and the subterranean formation. As described above, the systems, methods and cement compositions of the present disclosure generally comprise a cement, the partially agglomerated silica infused hydratable polymer, and water.

As will be appreciated by those of ordinary skill in the art, the systems, methods and cement compositions of the present disclosure may be used in a variety of subterranean applications, including primary and remedial cementing. The cement compositions may be introduced into a well bore and allowed to set. The systems, methods and cement compositions may comprise cement, the partially agglomerated silica infused hydratable polymer, and water. By way of example, in example primary cementing applications, a cement composition may be introduced into an annular space between a subterranean formation and a pipe string (or between a pipe string and a larger pipe string) located in the subterranean formation. The cement composition may be allowed to set to form a hardened mass in the annular space. In addition, in example remedial cementing applications, a cement composition may be used, for example, in squeeze cementing operations or in the placement of cement plugs.

As will be appreciated, the delayed hydratable polymer may be used in a wide variety of subterranean operations and well treatment fluids including well cement, drilling fluids, spacing fluids, fracturing fluids, completion brines, or spotting fluids. Without limitation, an example method of well treatment may comprise providing a well treatment fluid comprising a base fluid and a delayed hydratable polymer wherein the delayed hydratable polymer comprises a hydratable polymer and amorphous silica; and introducing the well treatment fluid into a wellbore. Without limitation, another example method may be a method of well cementing that may comprise providing a cement composition comprising cement, a delayed hydratable polymer, and water, wherein the delayed hydratable polymer comprises a hydratable polymer and amorphous silica; and introducing the cement composition into a wellbore. Without limitation, another example method may be a method of well cementing that may comprise providing a well system comprising mixing equipment and pumping equipment; and pumping a treatment fluid from the mixing equipment down an interior of a casing disposed in a wellbore and into a wellbore annulus, wherein the well treatment fluid comprises an aqueous fluid and a delayed hydratable polymer, wherein the delayed hydratable polymer comprises a hydratable polymer and amorphous silica.

These methods of well treatment and/or well cementing may include any of the various features of the compositions, methods, and systems disclosed herein. Without limitation, the delayed hydratable polymer comprises at least one polymer selected from the group consisting of starch derivatives, cellulose derivatives, alginate, agar, arrowroot, carrageenan, collagen, gelatin, pectin, welan gum, guar gum, diutan gum, 2-acrylamido-2-methylpropane sulfonic acid and N,N,dimethylacetamide copolymer, xanthan gum, hydroxy ethyl cellulose, carboxymethyl hydroxyethyl cellulose, polyacrylamide, partially hydrolyzed polyacrylamide, acrylate copolymers, modified acrylamide polymers, graft polymers, and combinations thereof. The amorphous silica in the delayed hydratable polymer may be present in an amount of about 1% to about 20% by weight of the hydratable polymer. At least a portion of the amorphous silica may be infused into agglomerates of the hydratable polymer. The delayed hydratable polymer may have a particle size of about 3000 microns or less. The delayed hydratable polymer may be combined with the base fluid. The well treatment fluid may be introduced into a subterranean formation at or above a fracturing pressure.

Figure 1:
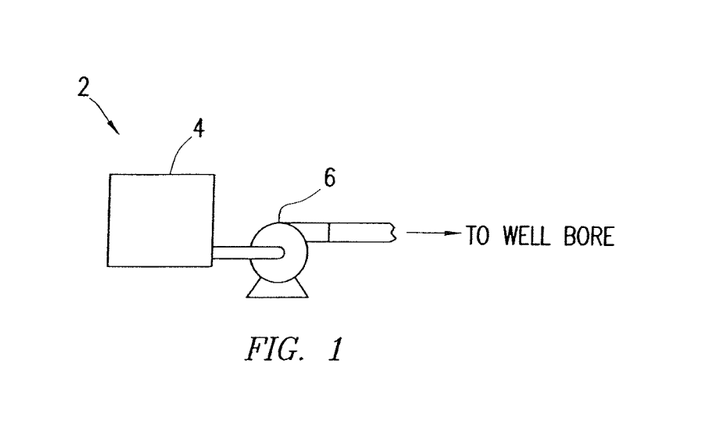
FIG. 1 is a schematic diagram that illustrates a system for preparation and delivery of a cement composition to a wellbore in accordance with certain examples.
Figure 2A:
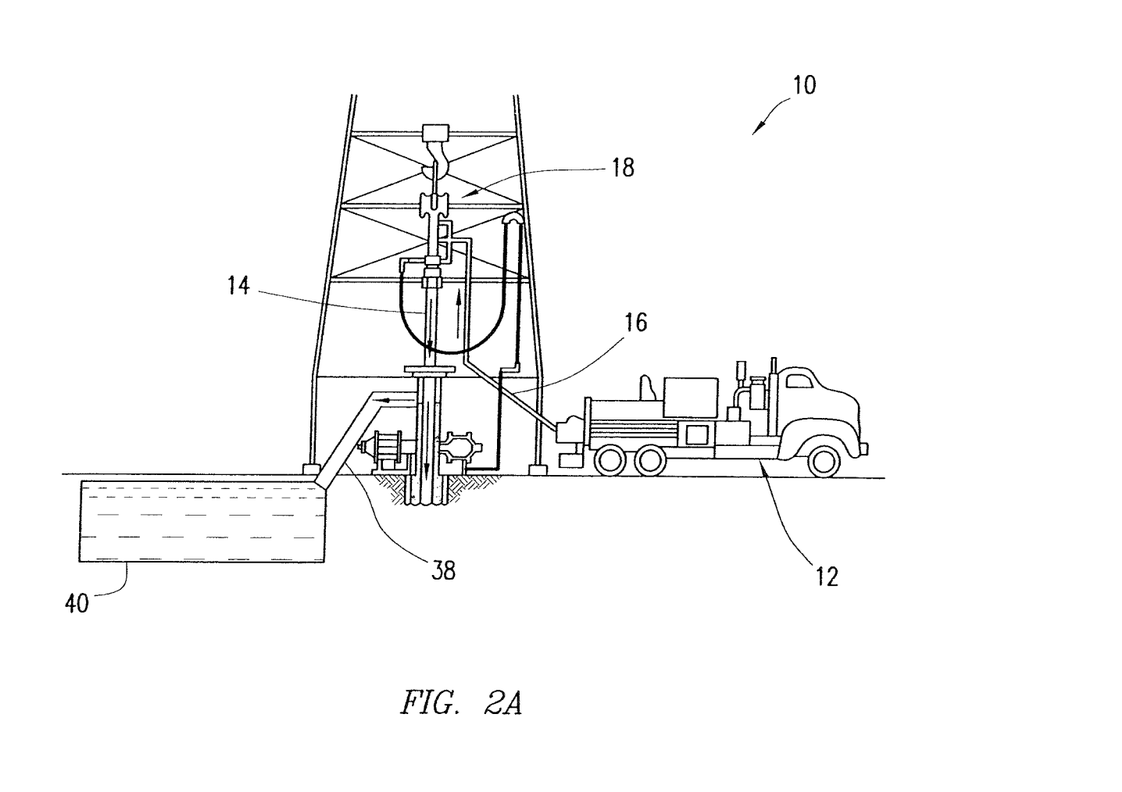
FIG. 2A is a schematic diagram that illustrates surface equipment that may be used in placement of a cement composition in a wellbore in accordance with certain examples.

Referring now to FIG. 1, preparation of a cement composition in accordance with example systems, methods and cement compositions will now be described. FIG. 1 illustrates a system 2 for preparation of a cement composition and delivery to a wellbore in accordance with certain systems, methods and cement compositions. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art. In some systems, methods and compositions, a jet mixer may be used, for example, to continuously mix the partially agglomerated silica infused hydratable polymer additive with the water (and other cement compositions) as it is being pumped to the wellbore An example technique for placing a cement composition into a subterranean formation will now be described with reference to FIGS. 2A and 2B. FIG. 2A illustrates surface equipment 10 what may be used in placement of a cement composition in accordance with certain systems, methods and cement compositions. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole Turning now to FIG. 2B, the cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

Figure 2B:
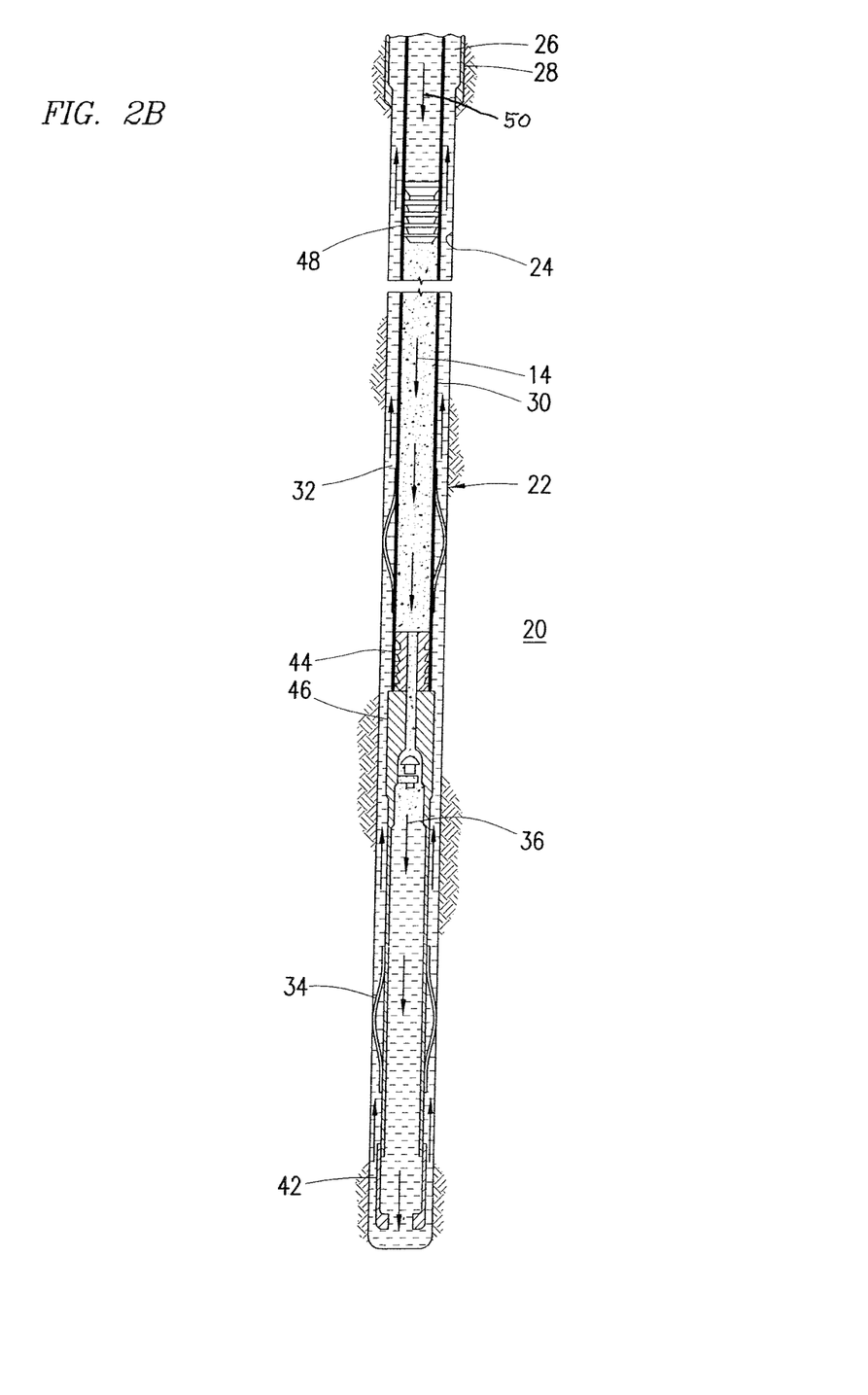
FIG. 2B is a schematic diagram that illustrates placement of a composition into a wellbore annulus in accordance with certain examples.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems, methods and cement compositions are given. In no way should the following examples be read to limit, or define, the entire scope of the disclosure.

Example 1

In this example, Lehigh class H cement was mixed with 0.1% (bwoc) diutan gum, and 47.18% (bwoc) water to create a 15.6 lb/gal slurry. Several tests were carried out both with and without infusion of amorphous silica into the diutan gum. Varying levels of amorphous silica were added to certain samples of the diutan gum. Diutan gum 9% means that 9% silica was added by weight of the diutan gum. Diutan gum 8.5% means that 8.5% silica was added by weight of the diutan gum. Diutan gum 6.4% means that 6.4% silica was added by weight of the diutan gum. The viscosity in centipoise was measure with a Fann® 35 viscometer at 300 RPM. Data for tests at 80° F. and 140° F. are presented in Tables 1 and 2 below.

TABLE 1

| | Test ran @ 80° F. | | | | | | | | | |
|---|---|---|---|---|---|---|---|---|---|---|
| | After Mixed | | | | After Cond. 20 min | | | | After Cond. 40 min | |
| RPM | Diutan Gum | Diutan Gum 9% | Diutan Gum 8.5% | Diutan Gum 6.4% | Diutan Gum | Diutan Gum 9% | Diutan Gum 8.5% | Diutan Gum 6.4% | Diutan Gum | Diutan Gum 9% |
| 300 | 140 | 60 | 41 | 114 | 158 | 111 | 130 | 155 | 160 | 104 |
| 200 | 114 | 47 | 34 | 90 | 123 | 83 | 100 | 117 | 122 | 83 |
| 100 | 83 | 36 | 27 | 63 | 87 | 58 | 63 | 80 | 84 | 64 |
| 60 | 70 | 32 | 23 | 53 | 72 | 47 | 56 | 63 | 69 | 56 |
| 30 | 60 | 29 | 20 | 43 | 58 | 37 | 43 | 48 | 55 | 52 |
| 6 | 50 | 23 | 16 | 33 | 54 | 38 | 26 | 37 | 52 | 34 |
| 3 | 48 | 13 | 10 | 32 | 50 | 35 | 25 | 32 | 47 | 25 |
| 600 | 220 | 92 | 74 | 193 | 235 | 145 | 201 | 235 | 230 | 150 |

TABLE 2

| | Test ran @ 140° F. After Cond 20 min. | | | |
|---|---|---|---|---|
| RPM | Diutan Gum | Diutan Gum 9% | Diutan Gum 8.5% | Diutan Gum 6.4% |
| 300 | 185 | 125 | 119 | 225 |
| 200 | 153 | 109 | 93 | 184 |
| 100 | 123 | 90 | 75 | 147 |
| 60 | 115 | 85 | 74 | 132 |
| 30 | 110 | 80 | 62 | 121 |
| 6 | 93 | 55 | 41 | 86 |
| 3 | 83 | 44 | 37 | 73 |
| 600 | 230 | 160 | 146 | 270 |

Example 2

In this example, Buzzi H cement was mixed with 0.1% hydroxyl ethyl cellulose (HEC) (bwoc) and 48.31% water (bwoc) to create a 15.6 lb/gal slurry. Several tests were carried out both with and without infusion of amorphous silica into the hydroxyl ethyl cellulose (HEC). Tests were performed using hydroxyl ethyl cellulose having a particle size from 250 microns to 420 microns and hydroxyl ethyl cellulose having a particle size 420 microns to 600 microns. The amorphous silica was infused into the hydroxyl ethyl cellulose in an amount of about 4% by weight for the 250 microns to 400 microns sample and about 6% by weight for the 420 microns to 600 microns sample. The HEC without silica fusion had a mean particle size of about 101 microns. The viscosity in centipoise was measured at ambient temperature with a Fann® 35 viscometer at 300 RPM.

TABLE 3

| | | After Mixed | |
|---|---|---|---|
| RPM | HEC | HEC + Silica 250-420 Microns | HEC + Silica 420-600 Microns |
| 300 | 96 | 97 | 79 |
| 200 | 85 | 78 | 66 |
| 100 | 61 | 58 | 51 |
| 60 | 51 | 49 | 44 |
| 30 | 44 | 43 | 39 |
| 6 | 36 | 31 | 23 |
| 3 | 30 | 20 | 16 |

Another test was conducted with Buzzi H cement mixed with 0.2% hydroxyethyl cellulose (bwoc) and 48.27% water (bwoc) mixed at 15.6 lb/gal.

TABLE 4

| | | After Mixed | |
|---|---|---|---|
| RPM | HEC | HEC + Silica 250-420 Microns | HEC + Silica 420-600 Microns |
| 300 | 217 | 188 | 122 |
| 200 | 176 | 150 | 88 |
| 100 | 122 | 106 | 65 |
| 60 | 95 | 86 | 56 |
| 30 | 71 | 68 | 49 |
| 6 | 44 | 57 | 37 |
| 3 | 40 | 55 | 29 |

Example 3

In this example, guar and silica infused guar gum were mixed with water and the viscosity was tested. Test 1 was the control with no silica infusion. Test 2 was performed with 10.3% silica infused by weight of guar gum with a particle size from about 100 to about 250 microns. Test 3 was performed with 10.3% silica infused by weight of polymer with a particle size from about 250 to about 420 microns. All tests were performed at ambient temperature with the Fann® model 35 viscometer at 300 RPM. The viscosity is reported in centipoise.

TABLE 5

| | Test 1 | Test 2 | Test 3 |
|---|---|---|---|
| Water (grams) | 500 | 500 | 500 |
| Guar (grams) | 2.4 | 2.4 | 2.4 |
| Time | Dial Reading | Dial Reading | Dial Reading |
| 0 | 15 | 6 | 5 |
| 1 | — | 8 | 6 |
| 2 | 20 | 9 | 7 |
| 3 | 23 | 10 | 9 |
| 5 | 28 | 12 | 10 |
| 10 | 27 | 15 | 11 |
| 15 | 27 | 17 | 13 |
| 20 | — | 17 | 14 |
| 30 | — | 23 | 17 |

Example 4

In this example, diutan gum and silica infused diutan gum were mixed with cement and water and the viscosity was tested. The silica infused diutan gum was a diutan gum with 6.4% silica infused by weight of polymer. All of the tests were performed at ambient temperature using Lehigh Premium Cement mixed at 14.8 lb/gal. The slurry was mixed and rheologies were taken immediately after mixing. The viscosity is reported in centipoise.

TABLE 6

| | Start Time after Mixing Began | Percentage of Material BWOC | RPM | | | | | | |
|---|---|---|---|---|---|---|---|---|---|
| | | | 3 | 6 | 30 | 60 | 100 | 200 | 300 |
| Diutan Gum | | 0.2 | 41 | 46 | 65 | 75 | 90 | 116 | 140 |
| | | | 35 | 41 | 60 | 72 | 85 | 113 | 138 |
| Diutan Gum | | 0.2 | 45 | 49 | 65 | 75 | 89 | 105 | 134 |
| | | | 36 | 39 | 57 | 70 | 82 | 109 | 134 |
| Diutan + Silica 250-420 Microns | 1:25 | 0.2 | 40 | 49 | 62 | 71 | 84 | 110 | 130 |
| | | | 35 | 38 | 54 | 66 | 78 | 104 | 126 |
| Diutan + Silica 250-420 Microns | 1:30 | 0.2 | 35 | 40 | 55 | 63 | 74 | 100 | 120 |
| | | | 29 | 31 | 46 | 58 | 70 | 96 | 120 |
| | 5:00 | | 28 | 31 | 47 | 60 | 74 | 105 | 126 |
| | | | 24 | 25 | 46 | 58 | 70 | 99 | 123 |
| Diutan + Silica | 1:25 | 0.2 | 28 | 31 | 39 | 44 | 54 | 75 | 92 |

TABLE 6-continued

| Start Time after Mixing Began | Percentage of Material BWOC | \multicolumn{7}{c}{RPM} |
|---|---|---|---|---|---|---|---|---|
| | | 3 | 6 | 30 | 60 | 100 | 200 | 300 |
| 250-420 Microns | | 21 | 24 | 33 | 41 | 50 | 70 | 90 |
| | 3:10 | 28 | 31 | 41 | 49 | 58 | 80 | 90 |
| | | 18 | 20 | 31 | 43 | 52 | 75 | 95 |
| | 5:00 | 2 | 29 | 39 | 46 | 55 | 80 | 98 |
| | | 18 | 20 | 33 | 44 | 55 | 80 | 102 |
| | 10:00 | 25 | 25 | 43 | 57 | 70 | 97 | 121 |
| | | 21 | 23 | 40 | 51 | 65 | 95 | 120 |
| | 15:00 | 21 | 24 | 37 | 49 | 64 | 96 | 125 |
| | | 19 | 21 | 38 | 50 | 62 | 91 | 120 |

TABLE 7

| | Time Conditioned | Percentage of material BWOC | \multicolumn{7}{c}{RPM} |
|---|---|---|---|---|---|---|---|---|
| | | | 3 | 6 | 30 | 60 | 100 | 200 | 300 |
| Diutan Gum | 30 min @ 100° F. | 0.2 | 40 | 49 | 73 | 87 | 103 | 133 | 158 |
| | | | 44 | 49 | 71 | 85 | 99 | 129 | 155 |
| Diutan + Silica 250-420 Microns | 30 min @ 100° F. | 0.2 | 31 | 40 | 66 | 80 | 95 | 126 | 150 |
| | | | 38 | 42 | 65 | 79 | 90 | 120 | 146 |
| Diutan + Silica 420-600 Microns | 30 min @ 100° F. | 0.2 | 37 | 44 | 60 | 72 | 85 | 115 | 137 |
| | | | 31 | 35 | 55 | 69 | 82 | 108 | 134 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of well treatment comprising:
providing a well treatment fluid comprising a base fluid and a delayed hydratable polymer, wherein the delayed hydratable polymer comprises a hydratable polymer and amorphous silica, wherein a portion of the amorphous silica is infused into agglomerates of the hydratable polymer, the amorphous silica at least partially encapsulating the hydratable polymer to delay release of the hydratable polymer; and
introducing the well treatment fluid into a wellbore.

2. The method of claim 1, wherein the well treatment fluid is a cement composition, a drilling fluid, a spacer fluid, a fracturing fluid, a completion brine, or a spotting fluid.

3. The method of claim 1, wherein the delayed hydratable polymer comprises at least one polymer selected from the group consisting of starch derivatives, cellulose derivatives, alginate, agar, arrowroot, carrageenan, collagen, gelatin, pectin, welan gum, guar gum, diutan gum, 2-acrylamido-2-methylpropane sulfonic acid and N,N,dimethylacetamide copolymer, xanthan gum, hydroxy ethyl cellulose, carboxymethyl hydroxyethyl cellulose, polyacrylamide, partially hydrolyzed polyacrylamide, acrylate copolymers, modified acrylamide polymers, graft polymers, and combinations thereof.

4. The method of claim 1, wherein the amorphous silica is present in an amount of about 1% to about 20% by weight of the hydratable polymer.

5. The method of claim 1, wherein the delayed hydratable polymer has a particle of about 3000 microns of less.

6. The method of claim 1, further comprising providing the delayed hydratable polymer and combining the delayed hydratable polymer with the base fluid.

7. The method of claim 1, wherein the introducing the well treatment fluid comprises introducing the well treatment fluid into a subterranean formation at or above a fracturing pressure.

8. The method of claim 1, wherein cracks and voids of the agglomerates comprise the amorphous silica.

9. A method of well cementing comprising:
   providing a cement composition comprising cement, a delayed hydratable polymer, and water; wherein the delayed hydratable polymer comprises a hydratable polymer and amorphous silica, wherein a portion of the amorphous silica is infused into agglomerates of the hydratable polymer, the amorphous silica at least partially encapsulating the hydratable polymer to delay release of the hydratable polymer; and
   introducing the cement composition into a wellbore.

10. The method of claim 9, wherein the delayed hydratable polymer comprises at least one polymer selected from the group consisting of starch derivatives, cellulose derivatives, alginate, agar, arrowroot, carrageenan, collagen, gelatin, pectin, welan gum, guar gum, diutan gum, 2-acrylamido-2-methylpropane sulfonic acid and N,N,dimethylacetamide copolymer, xanthan gum, hydroxy ethyl cellulose, carboxymethyl hydroxyethyl cellulose, polyacrylamide, partially hydrolyzed polyacrylamide, acrylate copolymers, modified acrylamide polymers, graft polymers, and combinations thereof.

11. The method of claim 9, wherein the amorphous silica is present in an amount of about 1% to about 20% by weight of the hydratable polymer.

12. The method of claim 9, wherein the delayed hydratable polymer has a particle of about 3000 microns of less.

13. The method of claim 9, wherein delayed hydratable polymer is present in the cement composition in an amount of about 0.1% to about 10% by weight of the cement.

14. The method of claim 9, further comprising providing the delayed hydratable polymer and combining the delayed hydratable polymer with the aqueous fluid.

15. The method of claim 9, wherein the cement composition is introduced into a wellbore annulus in a primary cementing operation.

16. The method of claim 9, wherein cracks and voids of the agglomerates comprise the amorphous silica.

17. A method of well cementing comprising:
   providing a well system comprising mixing equipment and pumping equipment; and
   pumping a treatment fluid from the mixing equipment down an interior of a casing disposed in a wellbore and into a wellbore annulus, wherein the well treatment fluid comprises an aqueous fluid and a delayed hydratable polymer, wherein the delayed hydratable polymer comprises a hydratable polymer and amorphous silica, wherein a portion of the amorphous silica is infused into agglomerates of the hydratable polymer, the amorphous silica at least partially encapsulating the hydratable polymer to delay release of the hydratable polymer.

18. The method of claim 17, wherein delayed hydratable polymer comprises at least one polymer selected from the group consisting of starch derivatives, cellulose derivatives, alginate, agar, arrowroot, carrageenan, collagen, gelatin, pectin, welan gum, guar gum, diutan gum, 2-acrylamido-2-methylpropane sulfonic acid and N,N,dimethylacetamide copolymer, xanthan gum, hydroxy ethyl cellulose, carboxymethyl hydroxyethyl cellulose, polyacrylamide, partially hydrolyzed polyacrylamide, acrylate copolymers, modified acrylamide polymers, graft polymers, and combinations thereof.

19. The method of claim 17, wherein the amorphous silica is present in an amount of about 1% to about 20% by weight of the hydratable polymer.

20. The method of claim 17, wherein cracks and voids of the agglomerates comprise the amorphous silica.

* * * * *